(No Model.)  5 Sheets—Sheet 1.

E. M. REED.
CONDUIT ELECTRIC RAILWAY.

No. 437,720.  Patented Oct. 7, 1890.

Witnesses.
N. B. Hagin
Wm A D Mansell

Inventor.
Ernest M. Reed.
By Wm J Hutchins
Atty.

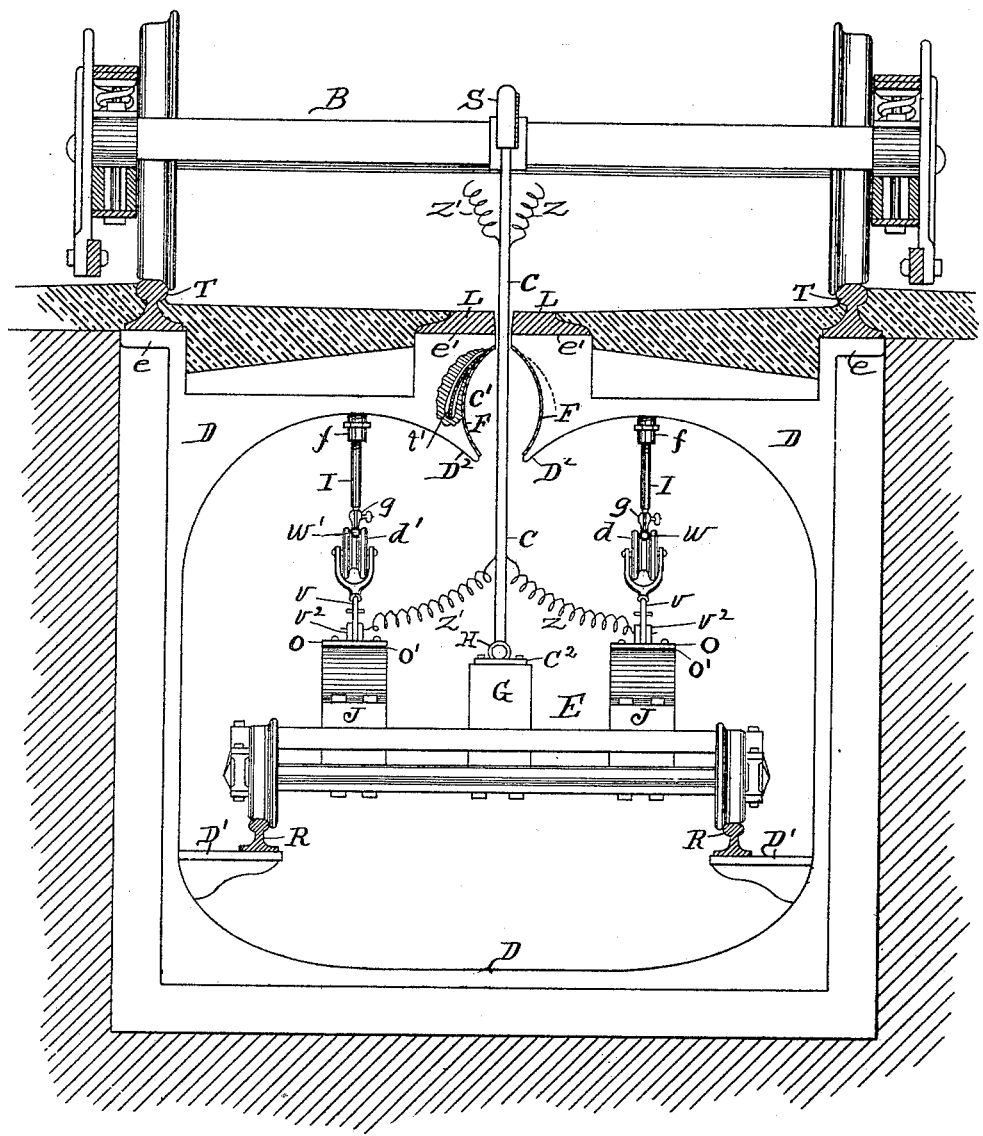

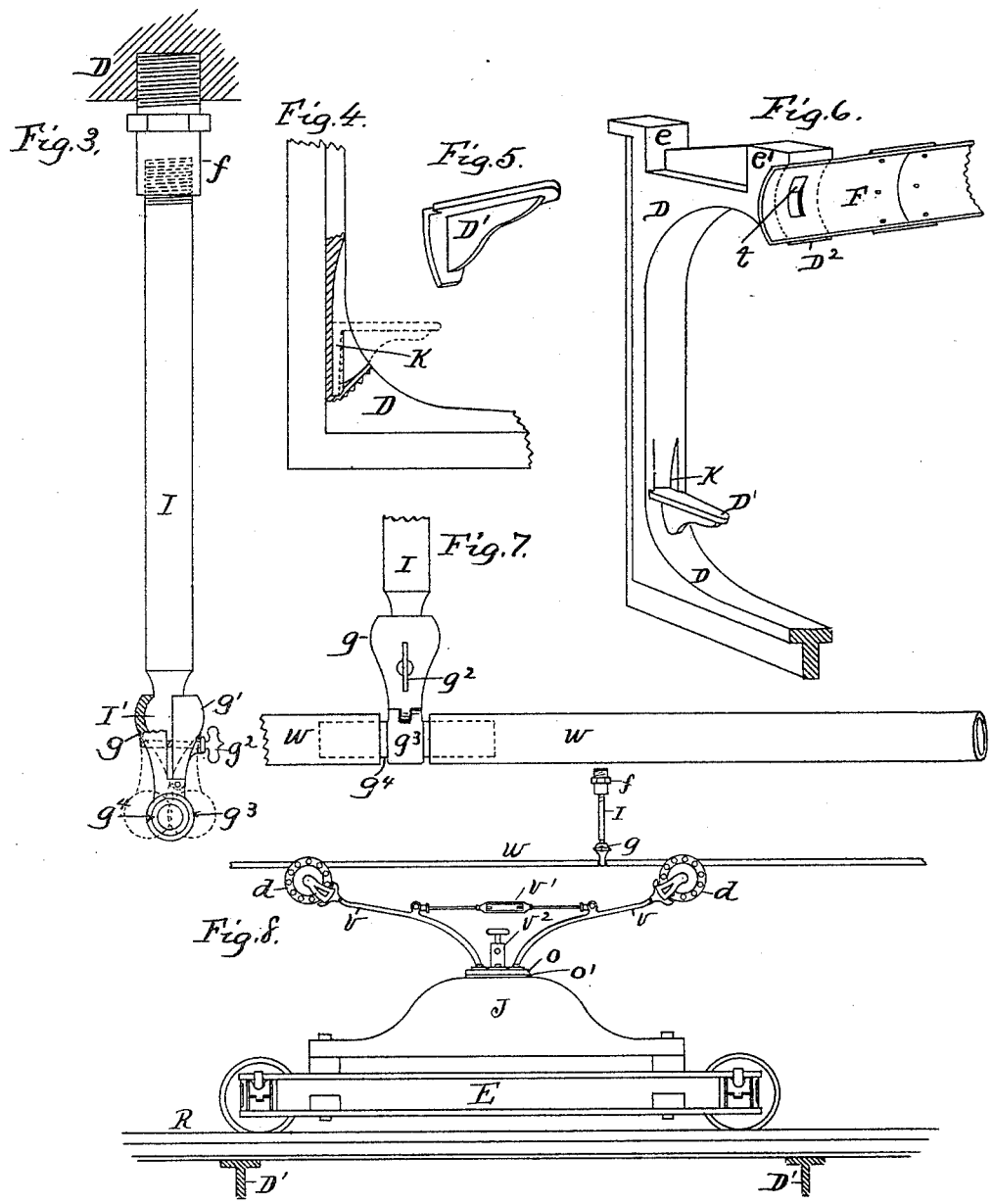

(No Model.) 5 Sheets—Sheet 4.
E. M. REED.
CONDUIT ELECTRIC RAILWAY.
No. 437,720. Patented Oct. 7, 1890.
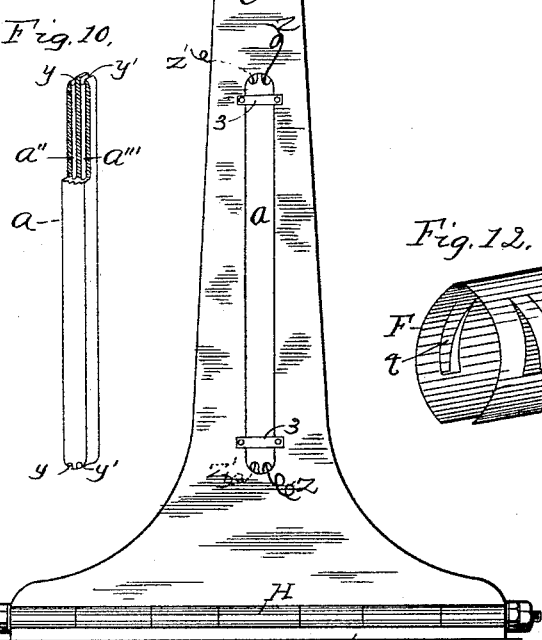
Witnesses.
N. B. Hagin
Wm. A. O. Munsell
Inventor.
Ernest M. Reed.
By Wm. J. Hutchins
Atty.

(No Model.) 5 Sheets—Sheet 5.
E. M. REED.
CONDUIT ELECTRIC RAILWAY.
No. 437,720. Patented Oct. 7, 1890.

Witnesses. Inventor.
N. B. Hagin Ernest M. Reed
Wm A. O'Minsell By Wm J Hutchins
Atty

UNITED STATES PATENT OFFICE.

ERNEST M. REED, OF WICHITA, KANSAS.

CONDUIT ELECTRIC RAILWAY.

SPECIFICATION forming part of Letters Patent No. 437,720, dated October 7, 1890.

Application filed March 10, 1890. Serial No. 343,300. (No model.)

*To all whom it may concern:*

Be it known that I, ERNEST M. REED, a citizen of the United States of America, residing at Wichita, in the county of Sedgwick and State of Kansas, have invented certain new and useful Improvements in Conduit Electric Railways, of which the following is a specification, reference being had therein to the accompanying drawings, and the letters of reference thereon, forming a part of this specification, in which—

Figure 1:
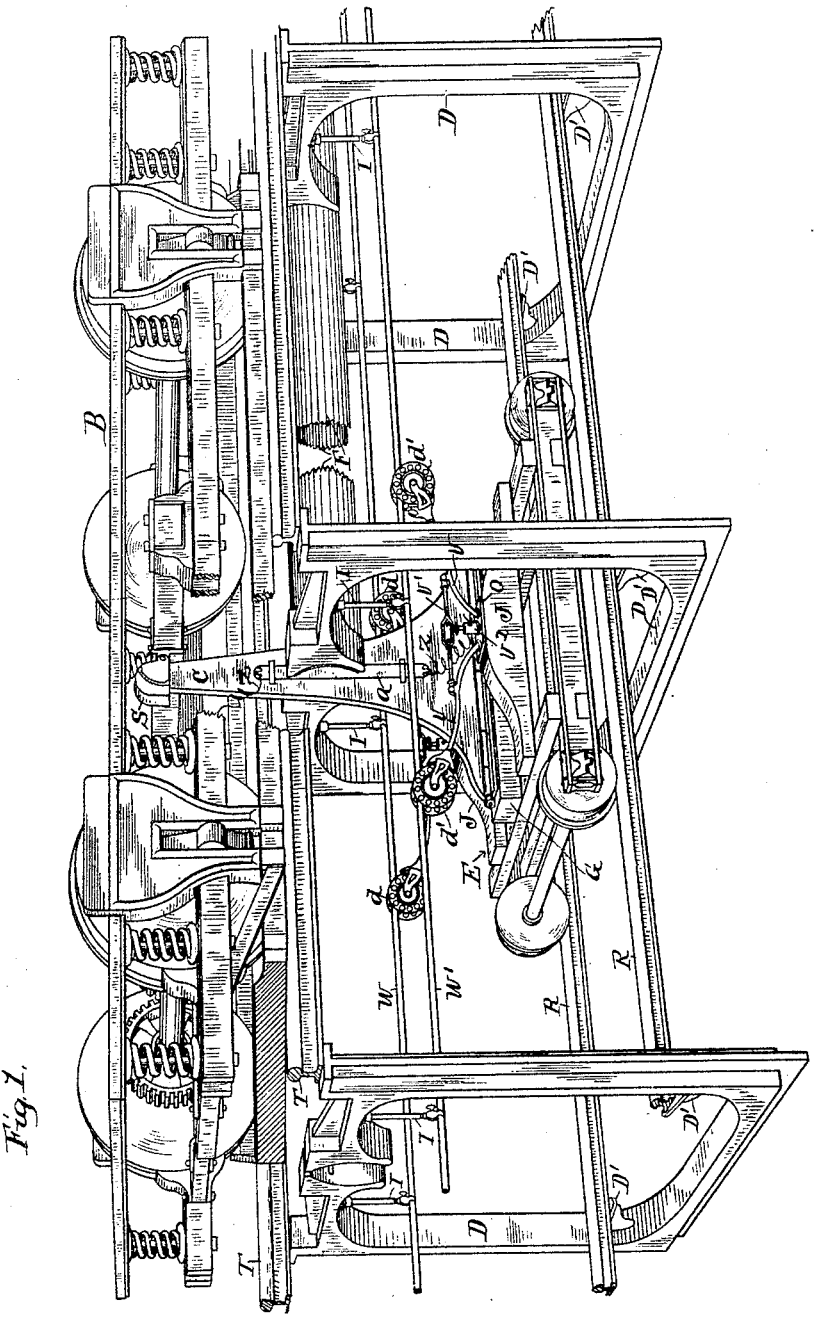
Figure 15:
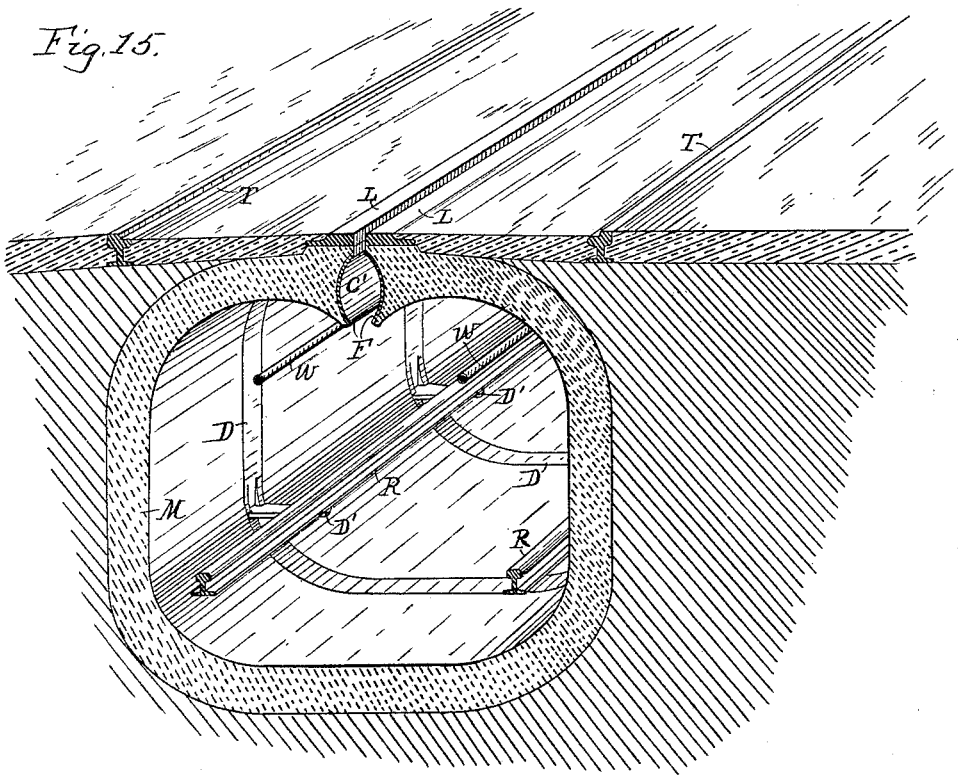
Figure 16:
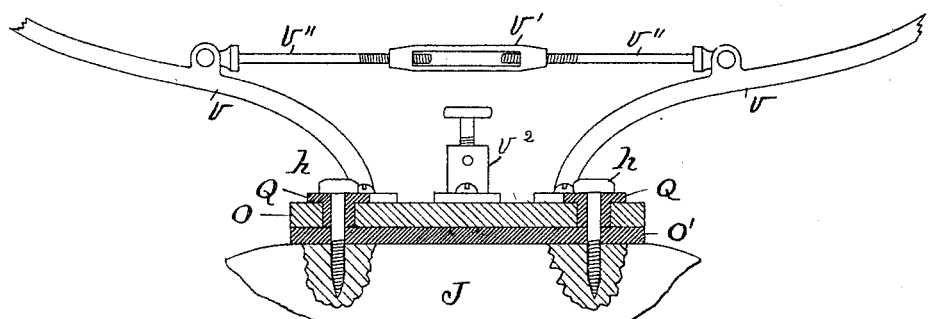

Figure 1 is a perspective view representing my invention as the several parts would appear in service. Fig. 2 is a vertical cross-sectional view of the conduit, of the surface and conduit tracks, and of the circuit-lines, a side plan of a conduit-yoke, an end plan or elevation of the conduit-carriage and its attached parts, and a section of a motor-car mounted on the surface track. Fig. 3 is a side plan view of one of the line-insulator hangers. Fig. 4 is a detailed portion of a conduit-yoke, showing in section its bracket-socket. Fig. 5 is a perspective view of a bracket, such as are employed to support the conduit-track. Fig. 6 is a detailed perspective view of one-half portion of a conduit-yoke. Fig. 7 is a side plan of a section of one circuit-line and a portion of a hanger thereof. Fig. 8 is a side plan of the trolley-carriage mounted on its track. Fig. 9 is a detailed side elevation of the hinged column of the trolley-carriage for communicating, through the conduit surface slot, with the motor-car above and a side plan of its pivoted socket for connecting it with the motor-car. Fig. 10 is a detailed perspective view of the chambered circuit-wire protector of said column. Fig. 11 is a detailed plan view of one of the trolley-stands.
Fig. 12 is a perspective view of a portion of the concave plates for lining the conduit surface slot. Fig. 13 is a detailed view showing the upper end portion of the said hinged column and a section of its connecting-socket.
Fig. 14 is a detailed plan view of the hinge-base of said column. Fig. 15 is a vertical cross-sectional view of the conduit through its concrete walls, for the purpose of showing the surface above, the surface track and slot, and the relative position of the yokes thereof; and Fig. 16 is a detailed view showing a side plan of the trolley-arms and their connecting turn-buckle and a section of their stand.

This invention relates to certain improvements in that class of electric railways wherein the circuit-lines are arranged in a conduit beneath the street surface, suspended by means of non-conducting hangers from respective sides of a double-arched conduit, and the motor of a car mounted on the surface track is connected with said circuit-lines through the medium of a trolley-carriage mounted on a track in the conduit, which carriage is provided with a hinged column extending through the conduit surface slot and connected with the motor-car, and by means of which the trolley-carriage is advanced; and it consists of the particular construction and arrangement of parts, which improvements are fully set forth and explained in the following specification and claims.

Referring to the drawings, D represents the conduit-yokes, which form the frame-work for supporting the stationary parts of this invention, and M the concrete walls of the conduit, which is of the same interior form as the yokes, both of which are formed with a double-arched interior and arranged immediately below the street surface and the surface-track T and T, as shown. The upper side portions of the yokes are provided with seats $e$, upon which the rails T rest and are secured, and with the center seats $e'$, one adjacent either side of the surface slot, and upon which are secured the bars L in a manner parallel with each other, and thus form the entrance to the surface slot. (See Fig. 15.)

$D^2$ are prominences of the yokes D at the inner terminal of the slot, and that portion of the yokes at each side facing the slot between said prominences and seats $e'$ is concave, and each such yoke-face is provided with a face slot leading back into a chamber $t'$ in the yoke-casting beneath seat $e'$.

F represents concave sheet-metal plates provided with the tongues $t$, cut from their body metal, (see Fig. 12,) which are arranged oppositely facing each other as a wall or lining for the surface slot immediately below the bars L, held in position by means of their tongues $t$, entered into the chambers $t'$ of the yokes, (see Figs. 2 and 6,) and by reason of their concave form a chamber oval in cross-section is formed the length of the conduit, as shown at $c'$. The concrete walls of the conduit are likewise formed with prominences corresponding with those of the yokes shown at $D^2$, which prominences are for the purpose of extending below the upper interior sides of the conduit, and thus form an arch at either side.

W and W' respectively represent the positive and negative circuit lines longitudinally arranged in the conduit, one at either side, suspended from their respective arch by means of the non-conductor hangers I, which are secured to the center part of the yoke-arches by means of the screw-threaded couplers $f$, and provided at their lower end with the ball I' (see Fig. 3) and a jointed socket-piece $g\ g'$, held connected with the ball by means of a screw $g^2$, as shown. The lower end of the socket-piece terminates with the eye $g^3$, clasping a hollow shank $g^4$, which shank extends a short distance in either direction, and the circuit-lines consist of sections of tubing corresponding in length to the distance between the hangers and are sleeved at each end upon the said shanks $g^4$, and thus by making the said lines in sections connected as described they are adapted to expand and contract lengthwise and not strain or buckle, and by being tubular they are adapted to conduct a current of warm dry air through them to keep them dry, which air may be forced in them at their end or at stations along their length.

K represents sockets formed in the yoke-castings, near their base, at the sides for the reception of brackets, and D' represents such brackets, which are for the purpose of a support for the conduit track-rails R R, and to which said rails are secured, which brackets are detachable for the purpose of adapting them to be replaced by others should they be broken.

E represents a carriage, consisting of a suitable frame mounted on four wheels, which are adapted to travel upon the track-rails R R in the conduit, and is provided with the two opposite side beams J and J and the center beam G, which beams are parallel with each other and with the tracks and circuit-lines. The said side beams J J are respectively arranged to support the trolleys $d\ d$ and $d'\ d'$ in contact with their respective circuit-lines through the medium of the arms V V and the stands $o$ and $o$, which stands are secured to the beams by means of the lag-screws $h\ h$ (see Fig. 16) and insulated from the beams and screws by means of the interposed non-conducting plates $o'$ and non-conducting bushings Q.

The trolley-arms V V are made yielding and provided, respectively, with a pivoted screw-rod V'', (see Fig. 16,) which are connected by means of the turn-buckles V', which are for the purpose of adjusting the height of the trolleys by either drawing together or forcing apart the said trolley-arms.

$V^2$ represents binding-posts respectively secured to the stands $o\ o$, from which the electric current is taken when it has passed through the trolleys, the trolley-arms, and their stand. The purpose of the double trolleys is to make two points of contact with each circuit-line, in order that should one trolley be disconnected from the circuit, as when passing the non-conductor of a switch or crossing or by other reasons, the fellow trolley will at such times be connected and the circuit not broken.

$c$ represents the hinged column of the carriage E, secured to the carriage-beam G at its base by means of the base-plate $c^2$ and hinge H in such manner that the column will extend up through the conduit surface slot and adapted to tilt sidewise slightly by turning on its hinge.

B represents an ordinary electric-motor-car truck mounted on the surface track T above the trolley-carriage E, and is provided with the hinged socket S, secured to one of its beams, arranged to turn down over the upper end of the column $c$, (see Figs. 1 and 9,) for the purpose of connecting the trolley-carriage with the motor-truck B, so the trolley-carriage will be advanced on its track when the motor-truck advances, and as a means of raising or lowering said socket it is provided with a toothed segment S', secured to its side, set so its curve radiates from the hinge $r$ of the socket, and a corresponding segment $S^2$, fixed on a shaft of the motor-truck and operated by a hand-lever $m$, is arranged in mesh with said segment S', when by operating the lever the action of the segments will turn the socket to disconnect or connect the column. The keeper $b$ is for the purpose of a rest for the lever to arrest further down movement; also, the interior of the socket is provided with a spring $S^3$, (see Fig. 13,) which acts as a cushion to yieldingly support the socket or to yield should the column be forced deeper into the socket by reason of inclinations of the track-bed or the like; also, the socket is of sufficient depth to permit a limited vertical play of the column therein, so as not to become disengaged should the motor-car truck pass over an obstruction.

$a$ represents the circuit-line protector of column $c$, and is provided with the two longitudinal chambers or holes $a''\ a'''$ and with the end cavities $y\ y$ and $y'\ y'$, (see Fig. 10,) which protector is arranged in a vertical recess of the column $c$ and held therein by means of the cross-plates $z\ z$. (See Fig. 9 and also Fig. 1.)

Z and Z' respectively represent the positive and negative circuit-connecting wires connected with their respective binding-posts $V^2$ of carriage E at their lower end, from thence leading to and up through their respective chambers or holes $a''\ a'''$ of the protector $a$, and from thence respectively to the positive and negative polls of the electric motor of car B, (not necessary to be more fully shown than illustrated in Fig. 1,) which wires are insulated and for the purpose of conducting the electric current from the positive-circuit line W through the trolley mechanism and the motor of the car or truck B and return by a like passage to the negative-circuit line W', thus connecting the circuit and conducting the same through the said motor for the purpose of operating the same to give motion to the truck B in the usual manner.

In service the carriage E is arranged on the track R R, as shown in Figs. 1 and 2, with the trolleys in contact with their respective circuit-lines, and the column c arranged extending up through the surface slot under the motor-truck B and connected with the socket S, as shown in said figures, when the wires Z Z' are connected with the motor mechanism, when the circuit may be connected or disconnected at the motor to give motion to or stop the truck in the usual manner, which is not necessary to be herein described, as that forms no part of this invention, it only being necessary in the complete operation in electric railways.

The result attained by the use of the oval-shaped slot-chamber c' and the prominences of the yokes and conduit concrete walls at the inner terminal of the surface slot is that all water entering at the slot will be conducted to and discharged at said prominences below the point of securing the circuit-line hangers at either side in the conduit, thus insuring the discharge of such water at the center between the circuit-lines and carriage-track and thoroughly preventing it from moistening the circuit-line hangers or the said lines; also, should it occur that sticks, bars, or the like should at times fall into or otherwise enter the conduit through the surface slot they will positively be guided to the center and fall between the circuit-lines and carriage-track and not obstruct the conduit or interfere with the circuit-lines, for the reason that should they enter in a vertical position the entrance and inner terminal of the slot will guide them directly downward, and should they fall or enter in a horizontal or angling position their engagement with the concave walls of the chamber c' will bring them to a parallel position with the inner-slot terminal and thus cause them to fall centrally, and thus such form of surface slot with its inner prominences serves as a protector for the circuit-lines and carriage-track in the conduit against moisture and obstructions.

The purpose of the protector a is to protect the circuit-connecting wires Z Z' where they pass up through the conduit surface slot, so they will not become worn.

The purpose of the ball-and-socket joint of the hangers I is to permit a limited side sway of the circuit-lines W W', so the lines will better accommodate themselves to the trolleys.

As a means to prevent one from receiving an electric shock when adjusting the turn-buckle of the trolley-arms the pivotal pieces V''' of the screw-rods V'' thereof (see Fig. 16) are made of non-conducting material, thus insulating the turn-buckle.

The purpose of making the conduit-track rail-brackets detachable is, in addition to adapting them to be replaced by others, to adapt them to be removed until after the conduit concrete walls are made, thus leaving the interior free from obstructions which would prevent the sliding along of the form used when constructing the conduit.

Having thus described my invention, what I claim as new and useful, and desire to secure by Letters Patent, is as follows:

1. In a conduit electric railway, the combination, with the conduit-yokes provided with the depending prominences $D^2$, adjacent the inner portion of the surface slot, of the concaved plates F, secured to said yoke prominences and arranged to form the side walls of the surface slot, and as a means for supporting the concrete filling between the yoke-frames along the slot sides within the side arches of the conduit, substantially as set forth.

2. In a conduit electric railway, the conduit comprising the yoke-frames provided with depending prominences adjacent the surface slot and arranged at suitable regular intervals apart, the concave plates respectively secured to the opposite facing sides of the said prominences, and the concrete walls between the yoke-frames, wherein a continuous unbroken arch is formed at each side of the surface slot, substantially as described and shown.

3. In a conduit electric railway provided with the conduit track-rails R R and the surface slot and surface track-rails T T, the combination, with an electric-motor car and the circuit-lines W W', suspended by means of the non-conducting hangers within the conduit, of the carriage E, mounted and adapted to travel on the conduit track-rails, of the trolleys d d and d' d', supported by the carriage through the medium of the insulated stands o o and the arms V in contact with their respective circuit-lines, the column c, hinged to and supported by the carriage and arranged extending upward through the conduit surface slot, the hinged socket S, the motor-car adapted to turn down over and inclose the upper end of the column, the binding-posts $V^2$ of the trolley-stands, the circuit-connecting-wire protector a of the column, and the circuit-connecting wires Z Z', substantially as and for the purpose specified.

4. The combination, with the carriage E, provided with the longitudinal beams J J, of the stands o, provided with the trolley-arms V and the trolleys and with the binding-posts $V^2$, and secured to said beams by means of screws or bolts, the interposed non-conducting plates o' and bushings Q, for insulating the trolley-stands from the carriage, and the turn-buckle for adjusting the trolleys, substantially as and for the purpose specified.

5. The combination, with the carriage E, provided with the longitudinal beam G, of the column c, hinged to said beam, the hinged socket S of the motor-car, and the circuit-conductor-wire protector a, arranged in a recess of the column, substantially as and for the purpose set forth.

6. In a conduit electric railway provided with a carriage-track in the conduit, a central conduit surface slot, and a surface car-track, the combination, with an electric-motor car mounted on the surface track and a positive and negative circuit line suspended by means of non-conducting hangers in the conduit, of a carriage mounted on the track in the conduit, provided with trolleys arranged in contact with the respective circuit-lines, supported by means of stands and arms, and insulated from the carriage by means of interposed non-conducting plates, and with a central hinged column extending upward through the conduit surface slot, and with a positive and a negative circuit conducting-wire arranged to conduct the electric current from the trolley mechanism in contact with positive-circuit line to the motor-car on the surface track and similarly return the current to the negative-circuit line, and the hinged socket for connecting the conduit-carriage with the surface motor-car, substantially as and for the purpose set forth.

7. In the electric railway described, the combination, with the conduit-carriage E and the motor-truck B, of the column c, hinged to the carriage at its lower end and connected through the medium of the hinged socket S with the motor-truck, substantially as and for the purpose specified.

8. In the electric railway described, the hinged column c, for connecting the conduit-carriage with the surface motor-truck and provided with the vertical recess, and chambered protector a, for guiding and protecting the circuit-connecting wires, substantially as set forth.

9. A conduit electric railway provided with a carriage-track and a positive and a negative circuit line in the conduit, a carriage arranged to travel on the conduit-track, a pair of trolleys arranged in contact with each said circuit-line, supported by and insulated from the carriage, a column hinged to and supported by the carriage and arranged extending upward through the conduit surface slot, an electric-motor car provided with a hinged socket arranged to inclose the upper end of the column, and with circuit-conducting wires connecting the respective trolleys with their respective poles of the motor-car, substantially as set forth.

10. In the electric railway described, the combination, with the conduit-carriage E, provided with the longitudinal beams J J and G, of the stands o, provided with the arms V and the trolleys and with the binding-post $V^2$, the interposed non-conducting plates $o'$, and bushings Q, for insulating the stands from the carriage, and the hinged column c, provided with the vertical chamber and chambered protector a, substantially as and for the purpose set forth.

11. The combination, with the trolley-stands and the arms V thereof, of the turn-buckle mechanism $V'$ $V''$, connected with said arms through the medium of the non-conducting pivotal sections $V'''$, substantially as and for the purpose specified.

12. The combination, with the yoke-frames D, provided with the socket-chambers K, of the detachable brackets $D'$, for supporting the conduit track-rails, substantially as set forth.

ERNEST M. REED.

Witnesses:
  WM. A. O. MUNSELL,
  H. B. HAGIN.